United States Patent

Matsunaga et al.

(10) Patent No.: US 7,561,988 B2
(45) Date of Patent: Jul. 14, 2009

(54) CUSTOMER SUPPORT SYSTEM

(75) Inventors: Wataru Matsunaga, Odawara (JP); Kazuyoshi Mihara, Kanagawa (JP); Toshio Takagi, Kanagawa (JP)

(73) Assignee: Amada Company, Limited, Kanagawa (JP)

( * ) Notice: Subject to any disclaimer, the term of this patent is extended or adjusted under 35 U.S.C. 154(b) by 0 days.

(21) Appl. No.: 10/936,498

(22) Filed: Sep. 9, 2004

(65) Prior Publication Data

US 2006/0053023 A1    Mar. 9, 2006

(51) Int. Cl.
*G04F 1/00* (2006.01)
*G04F 3/00* (2006.01)
*G04F 8/00* (2006.01)
*G04F 10/00* (2006.01)
*G06F 11/00* (2006.01)
*G06F 19/00* (2006.01)

(52) U.S. Cl. ............... 702/188; 702/176; 700/108; 700/110; 709/224

(58) Field of Classification Search ............... 709/224; 700/108, 110; 702/176, 188
See application file for complete search history.

(56) References Cited

U.S. PATENT DOCUMENTS

| | | | | |
|---|---|---|---|---|
| 5,485,391 A * | 1/1996 | Lindstrom | ............... | 700/175 |
| 6,061,668 A * | 5/2000 | Sharrow | ............... | 705/400 |
| 6,298,377 B1 | 10/2001 | Hartikainen et al. | ........ | 709/223 |
| 2002/0052844 A1 | 5/2002 | Schoop | ............... | 705/41 |
| 2002/0169514 A1 * | 11/2002 | Eryurek et al. | ............... | 700/110 |
| 2003/0009313 A1 * | 1/2003 | May et al. | ............... | 702/188 |
| 2003/0036933 A1 * | 2/2003 | Shetty et al. | ............... | 705/7 |
| 2003/0154144 A1 | 8/2003 | Pokorny et al. | ............... | 705/28 |
| 2004/0073469 A1 | 4/2004 | Emori | ............... | 705/8 |
| 2004/0078310 A1 | 4/2004 | Shaffer | | |
| 2004/0133397 A1 * | 7/2004 | Bjornson | ............... | 702/185 |
| 2004/0204775 A1 | 10/2004 | Keyes et al. | | |
| 2005/0033468 A1 * | 2/2005 | Pate et al. | ............... | 700/110 |

FOREIGN PATENT DOCUMENTS

| | | |
|---|---|---|
| EP | 0964325 | 12/1999 |
| EP | 1357484 | 10/2003 |
| WO | 01/50099 | 7/2001 |

* cited by examiner

*Primary Examiner*—Eliseo Ramos Feliciano
*Assistant Examiner*—Janet L Suglo
(74) *Attorney, Agent, or Firm*—Greenblum & Bernstein, P.L.C.

(57) ABSTRACT

A method is provided for centrally monitoring machines running at remote customer sites and providing customers with adequate support. The method includes collecting machine operating data, including data for each process stage, at the customer sites, and analyzing, at a central location, the collected machine operating data for each machine. Subsequently, a solution based upon the analysis is proposed to the customer for each of the machines, and the solution is then implemented. The method also includes continuously collecting data to check effectiveness of the installed machines and to verify the solution works.

8 Claims, 10 Drawing Sheets

CUSTOMER SUPPORT SYSTEM

BACKGROUND OF THE INVENTION

1. Field of the Invention

The present invention relates to the field of customer support. More particularly, the present invention relates to monitoring and supporting machinery installed at a customer's premises.

2. Background Information

Current customer support systems require manual collection of data. Thus, real time analysis of the data is not possible.

It would be desirable to have an automated monitoring system that continuously monitors installed machines. Such a system would facilitate support of the installed machinery and ensure effectiveness of the machines.

SUMMARY OF THE INVENTION

In view of the foregoing, the present invention is directed to continuously monitoring installed sheet metal machinery.

According to an aspect of the present invention, a method is provided for centrally monitoring machines running at remote customer sites and providing customers with adequate support. The method includes collecting machine operating data for each process stage at the customer site. The method also includes analyzing, at a central location, the collected machine operating data for one of the machines. The method further includes proposing to a customer a solution based upon the analysis, and implementing the solution. The data is continuously collected to check effectiveness of the installed machines and to verify the solution works. The method may also include researching a machine status before machine installation. In one embodiment, the proposal is for a profit increase based upon current data. The machine operating condition data may include a machine operation log, graphics images of the operating machine, a maintenance history, and a history of purchased parts.

The analyzing may include comparing a manufacturing time for a product after an upgrade with a target manufacturing time for the product. The analyzing may also include comparing a newly installed machine's performance with an old machine's performance. The analyzing may further include comparing a processing time for a product on a newly installed machine with a known average processing time for the product. The analyzing can also include analyzing a long term trend.

In another aspect of the present invention, a method is provided for installing a new machine. The method includes frequently recording machine operating conditions for the machine, including information for each process stage, which was installed at a remote location, and analyzing the recorded data at a central location. The method further includes suggesting new products and/or services to solve problems found through analysis, and ordering new products immediately. After the new products are delivered, installation effectiveness is continuously monitored.

In yet another aspect of the present invention, a method is provided for maintaining a machine installed at a remote location. The method includes frequently recording machine operating conditions for each process stage, and analyzing the collected data. The method also includes suggesting machine maintenance or parts to solve a problem found through analysis, and immediately ordering and delivering parts that solve the problem. The problem and solution are reported to the customer, and the machine is continuously monitored to verify that the problem was solved. The problem may be a problem predicted based upon a history of machine operating conditions. The problem may also be a current problem detected from decreased performance indicated by the machine operating conditions.

In yet another aspect of the present invention, a system provides customer support of newly upgraded machinery and/or newly installed machinery. The system includes machines to be monitored, each located at a customer site, and an operating data monitoring and collection system that monitors the machines. The system also includes a call center that receives data from the operating data monitoring and collection system, including data for each process stage, and records the data for analysis. The call center may prepare a proposal based upon the analysis, the proposal being presented to a customer. In one embodiment, the data includes a machine operation log, and graphics images of the operating machine.

The analysis may include comparing a manufacturing time for a product after an upgrade with a target manufacturing time for the product, comparing a newly installed machine's performance with an old machine's performance, and/or comparing a processing time for a product on a newly installed machine with a known average processing time for the product.

In yet another embodiment, the system also includes portable devices that communicate with the call center, the portable devices being operated by a sales representative or a service engineer. One of the portable devices may collect data for each stage of a process by transmitting to the call center a indication of a beginning of the process, and when the process completes, transmitting to the call center an indication of an ending of the process.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION

The present invention is directed to a system that enables centralized support of installed machinery by continuously monitoring the installed machinery.

The system keeps track of the customer's machine operating conditions accurately and suggests products and services based on the data recorded during operation.

An object of the present invention is to explain to customers the effectiveness of the installed machine based upon a comparison of costs before and after installation.

Another object of the present invention is to continuously monitor and support machine operation until recognizing the planned effectiveness.

It is another object of the present invention to continuously monitor the operating machines and suggest maintenance services, such as supporting, examining and replacing consumable supplies.

It is a further object to monitor the operating machines to discover problems, and then suggest solutions.

Thus, the present invention continuously and accurately understands a customer's conditions, and provides appropriate suggestions and support until achievement of planned targets.

In one aspect of the present invention, a machine home doctor (MHD) team is assigned to operate and support the system. The team can be formed with a sales representative and a service engineer.

Figure 1:
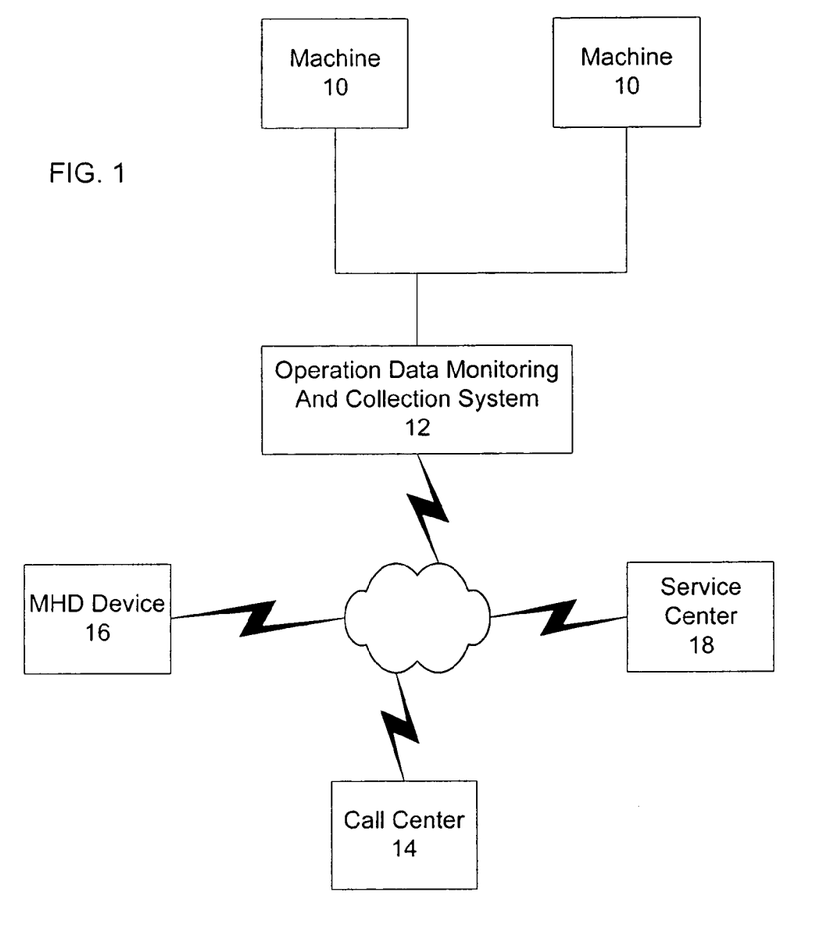
FIG. 1 illustrates an exemplary support system, in accordance with an aspect of the present invention.

Referring to FIG. 1, an exemplary support system will be described. Sheet metal machines 10 can be installed at a customer site. In one embodiment, the machines 10 are networked together. The machines are connected to an operation data monitoring and collection system 12 via a communication line. The operation data monitoring and collection system 12 continuously collects and monitors the data from the installed machines in the shop through the line of communication. The operation data monitoring and collection system 12 sends the collected machine operating data to a call center 14 at established intervals. The operation data monitoring and collection system 12 also sends graphics images to the call center 14 using a camera, which is installed on the machine 10. In case of an emergency, the operation data monitoring and collection system 12 automatically notifies, by e-mail or telephone, the call center 14.

The call center 14 receives information and stores the information for each customer. In one embodiment, the information is stored based upon the customer's name and the machine name. A data server may be provided to record archived product information, machine operating information and manufacturing data.

Exemplary information received at the call center includes machine operating information and graphics image information received from the operation data monitoring and collection system 12. Other information can be received from an MHD device 16, such as a personal computer or a cellular telephone carried by the service engineers and/or sales representatives of the MHD team. Information received from an MHD device 16 can include customer correspondence, such as questions and answers, and/or graphics images, as well as time stamps associated with the data.

The PC that the service engineers or the sales representatives carry, can input, edit, and display customer information data, such as the customer's work data and requirements. The PC may also analyze machine operating information and then provide service and suggest product for customers. In one embodiment, part ordering software, e.g., Part Navigator available from SolidWorks Corporation of Concord Mass., is provided on the PC, enabling the service engineer and/or sales representative to easily and promptly order parts while on-site. In this case, the Part Navigator software is modified to include an order function and access to a database storing parts.

The cell phone that service engineers or sales representatives carry can input, record and send the service information and a time-stamp. The cell phone can also record and send graphics images, such as photographs. In case the operation data monitoring and collection system 12 is inoperable or not set up, the cell phone can record and send a customer's machine operating information manually. The cell phone also enables a service engineer and/or sales representative to quickly order parts by part code.

A service center 18 may also be provided to support and manage service engineers and sales representatives. The service engineers and sales representatives can communicate with the service center 18 via cell phone or PC.

Figure 2:
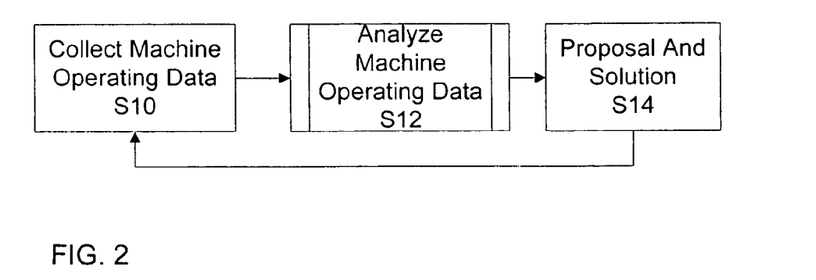
FIG. 2 show an overall customer support process, in accordance with an aspect of the present invention.

According to an aspect of the present invention, the customer support system can be used in a customer support process, which is shown in FIG. 2. Initially, the machine data is collected at S10. After the data has been collected, it is analyzed at step S12. Finally, a proposal can be presented. Alternatively, or in addition, a solution can be presented, at step S14. The process then continuously repeats. Each step of the overall process will be described in more detail below.

Exemplary customer information that can be collected will now be discussed. The customer information can include the actual machine operating data. This machine operating data is specific to the machine that is being monitored, and can include the number of different items manufactured each day, the quantity of the same items manufactured each day, the number of hits each day, the amount of processing time each day (excluding set up time), and the amount of material processed each day.

Figure 3:
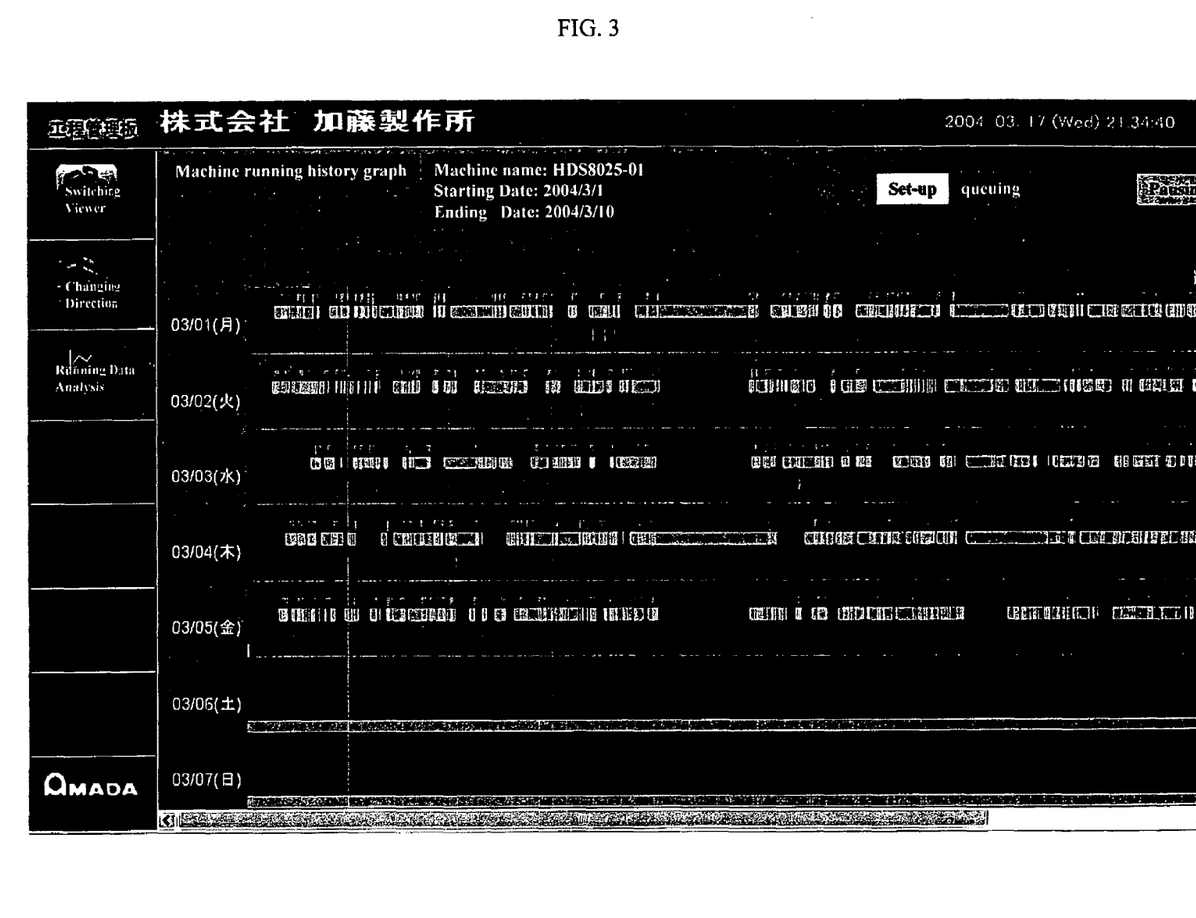
FIG. 3 shows an example of a machine's operating history, according to an aspect of the present invention.

Actual manufacturing data is also collected based upon manufactured product part information. Exemplary information includes the manufacturing time required for a product, the cost to manufacture the product, and the history of the machine while manufacturing the part. The history can show how much time was spent operating, setting up, queuing, stopping (because of alarms) and pausing. FIG. 3 shows an exemplary machine history.

Other customer information is based upon an overall analysis of the shop. The overall analysis, is of course focused on the machine operation. For example, in the case of an installed bending machine, how the customer is using software to obtain bend data is important. Thus, the software used and how long the software was used, whether 3D models were used, the tools that were used, the number of bends performed by a bending machine, etc. can be recorded.

Other customer information can include graphics. For example, pictures can be taken of the final product or defect locations. Question and answer information, such as customer requirements, claims, and the data that would be forwarded to the development divisions can also be part of the customer information, as can the maintenance history and part replacement history.

The machine operating data is preferably collected by the operation data monitoring and collection system 12. However, if that system is unavailable manual collection can occur. In this case, one of the MHD devices 16 can be used to collect the manufacturing time of specific parts.

Figure 4:
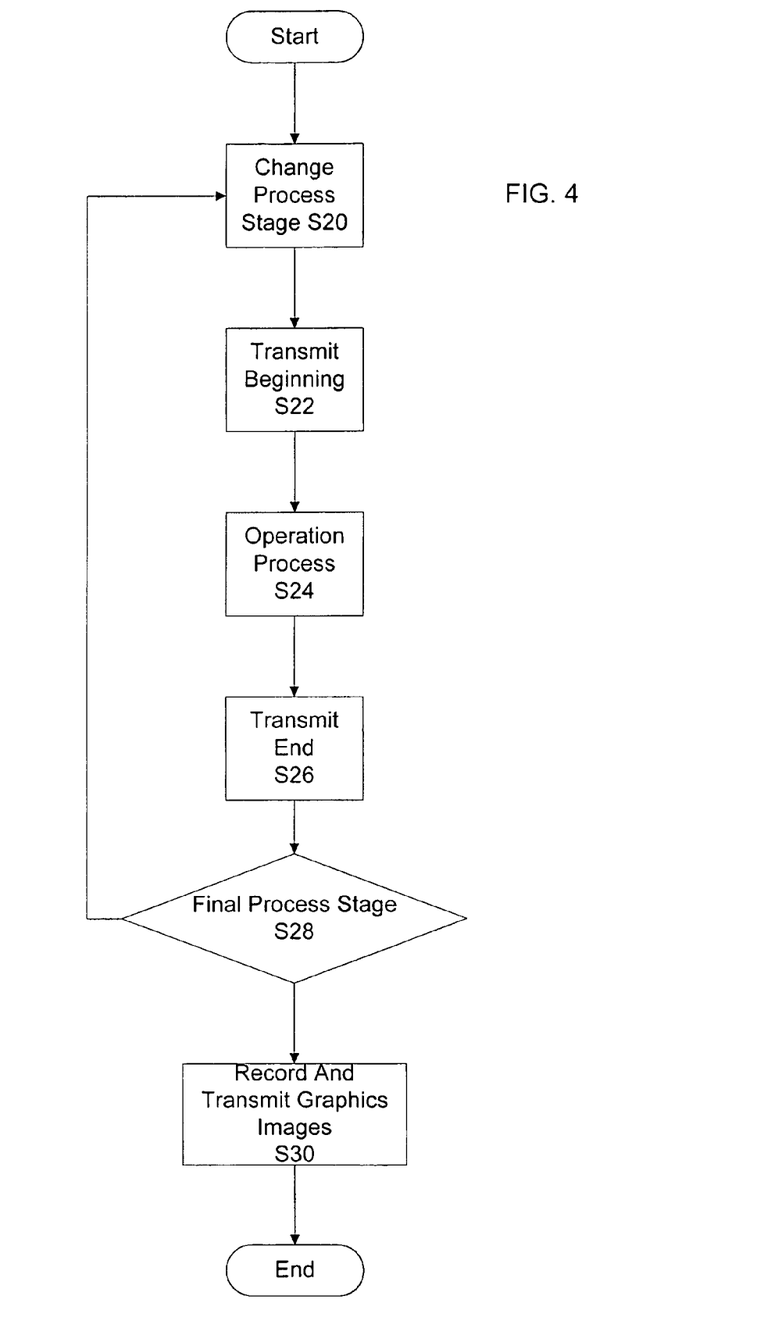
FIG. 4 shows a process for collecting machine operating data, according to an aspect of the present invention.

As shown in FIG. 4, the collection process includes several steps. Initially, the first process stage is set at step S20. In one embodiment, the following process stages are used to measure manufacturing time of a part: creating flats; sheet testing; double-checking; checking if the sheet is the same as the flat from the original drawing; verifying sheet manufacturing; selecting bend tool sequence; selecting bending machine data, e.g., L/D values; creating bend process data; machine set up; setting up the machine and bend tools; performing a bending test; and examination of the bent model.

After the process stage is set, the MHD device 16 connects to the call center 14 to indicate the start of the process, at step S22. Subsequently, the processing occurs, at step S24. Once the process is completed, the MHD device 16 indicates the same, at step S26. Then, it is determined if additional processing stages exist at step S28. If so, the process returns to step S20 and repeats with the next process stage. Otherwise, a graphics image is recorded and transmitted at step S30 and the process then ends.

Figure 5:
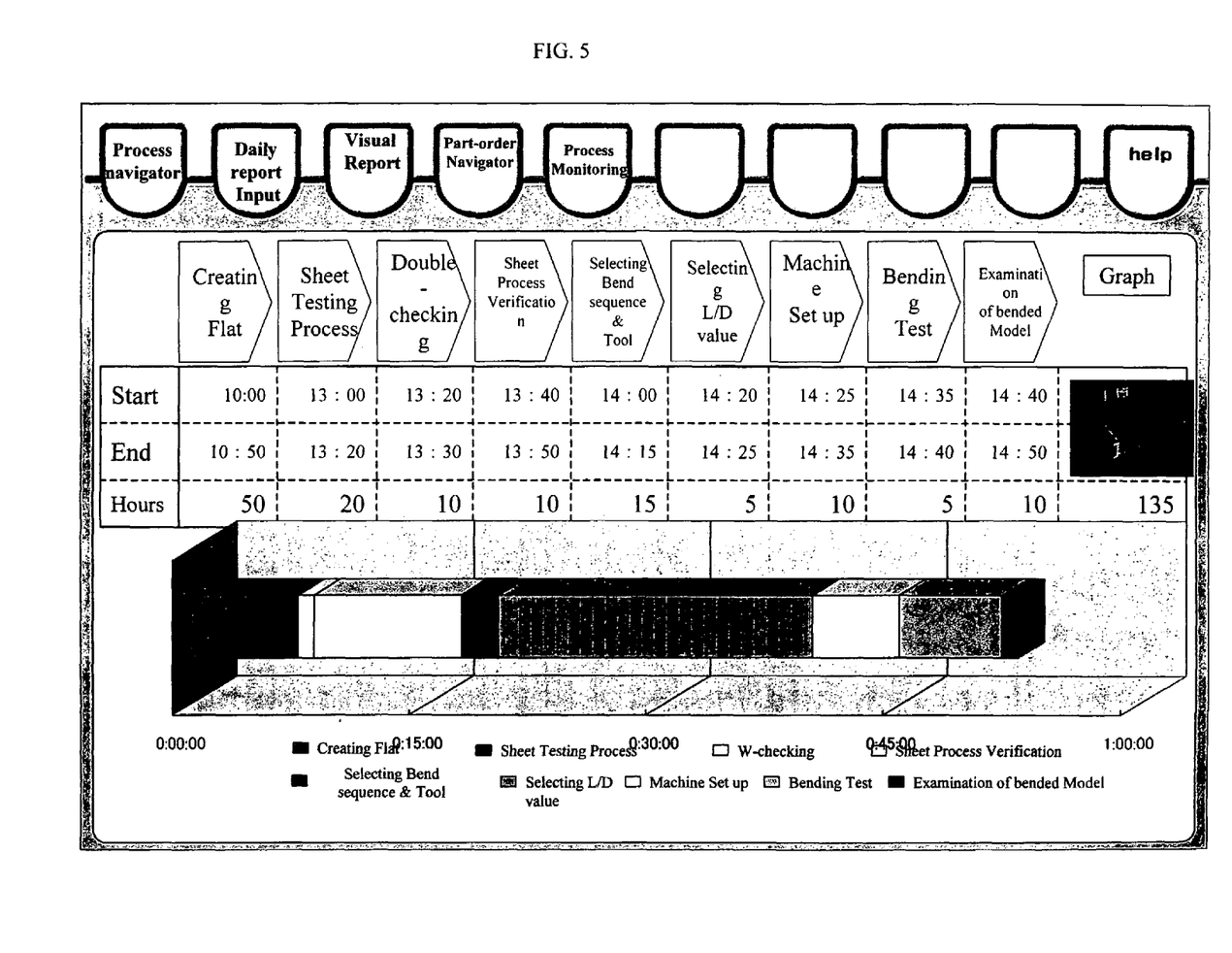
FIG. 5 shows an example of collected machine operating data, in accordance with an aspect of the present invention.

A display showing an example of collected manufacturing time is shown in FIG. 5. In the example of FIG. 5, creating the flat required fifty hours, sheet test processing required twenty hours, double checking required nineteen hours, sheet process verification required ten hours, selecting the bend sequence and tooling required fifteen hours, selecting the L/D values required five hours, the machine set up required ten hours, the bending test required five hours, and the examination required ten hours. Thus, the overall time was 135 hours. FIG. 5 also includes a bar graph showing the percentage of time each process stage required.

The analysis of step S12 is now discussed in further detail

After the time of each process stage is collected, evaluation of the time required to manufacture a product can occur by analyzing each step in the process. The collected machine operating data can be used for various purposes. For example, the efficiency of each individual step can be evaluated and problems can be spotted based upon the time required for the step.

Although the performance of each individual stage can be analyzed, such analysis may have limited value with respect to the overall manufacturing costs and efficiency. For example, new equipment directed to improving the efficiency of a first stage may indirectly reduce the time required for a second stage. In this case, even if the time for completing the first stage becomes longer than the pre-install time for that stage, the indirect improvement may outweigh the increased time for completing the first stage and therefore reduce the overall manufacturing time. Thus, measurement of the effectiveness of the new install/upgrade occurs for all of the stages.

Moreover, the duration of each stage can be used to calculate the total manufacturing cost, which can be provided to the customer as a target result. That is, the manufacturing cost for the product is a sum of the cost of each process stage.

In an embodiment of the present invention, several different types of analysis occur. A machine analysis can be performed, a product analysis can be performed, a time analysis can be performed, a historical data analysis can be performed, and a trend analysis can be performed. Each type of analysis will now be discussed in more detail.

The system of the present invention continuously collects data and analyzes the machines by comparing and verifying the effectiveness of the newly installed machine's operating performance versus the old machine's operating performance. More importantly, the machine analysis also compares a target value with the newly installed machine's operating performance. Such a comparison provides significant benefits, such as ensuring the installation is operating smoothly and showing unexpected results. If the post installation result is inferior to the targeted result, the present invention contemplates providing support (e.g., the MHD, customer support, etc.) to help achieve the targeted result. The machine analysis can also be applied to the same machine before and after an improvement, e.g., a software upgrade.

Figure 6A:
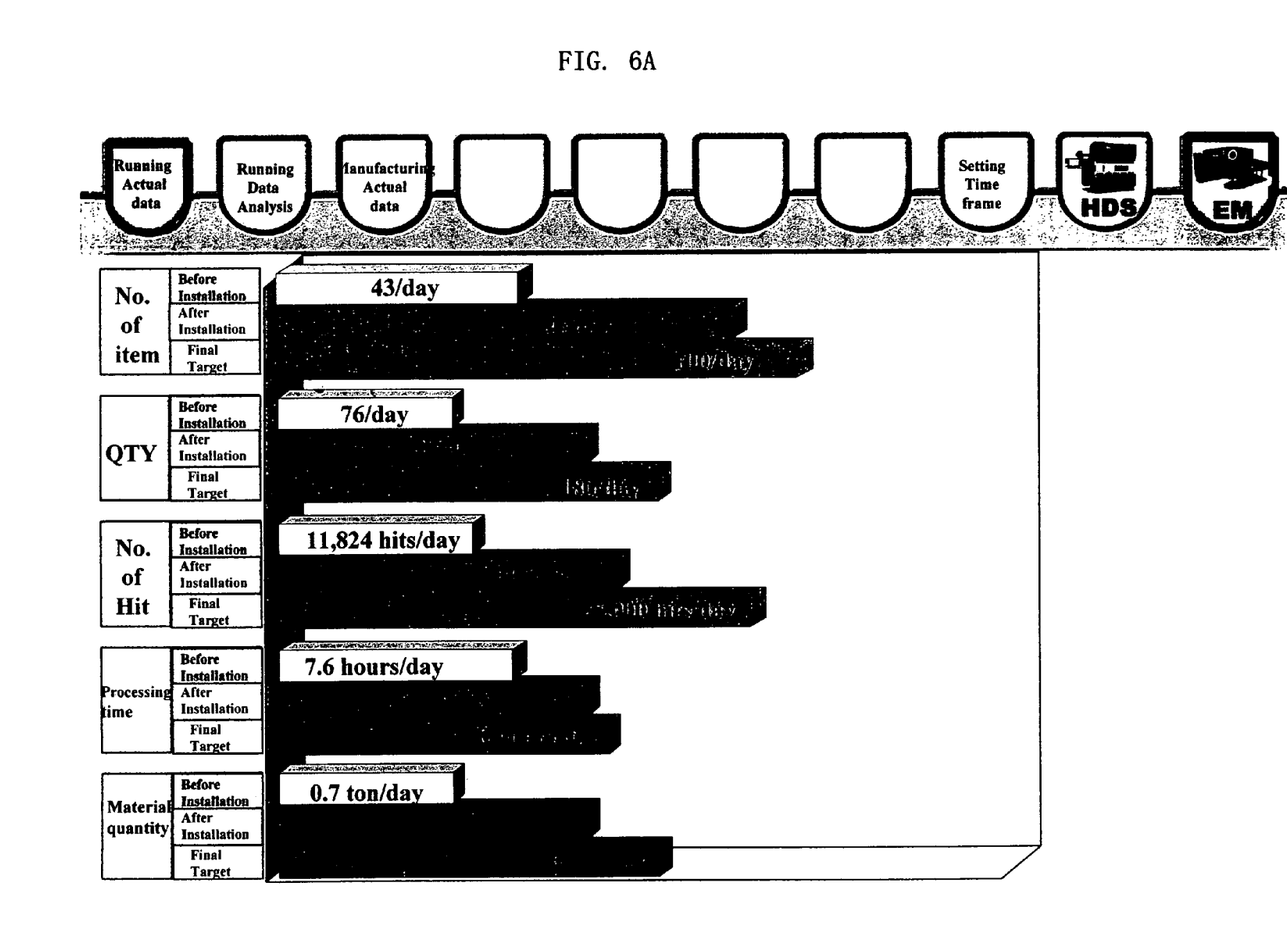
FIGS. 6A, 6B, and 6C show examples of a machine analysis, in accordance with an aspect of the present invention.

FIG. 6A shows an example of a machine analysis. It can be seen that before installation, only 43 different items were manufactured each day. After installation, 81 different items were manufactured, whereas the target is 100 items each day. Similarly, before installation, 76 units of an item were produced, 11,824 hits occurred each day, processing time was 7.6 hours each day, and 0.7 tons of material were processed each day. After installation, 158 units were produced each day, 20,532 hits occurred each day, processing occurred for 9.8 hours each day, and 1.4 tons of material were processed.

The target values are: 180 units of an item produced, 25,000 hits each day, 10 hours each day, and 1.6 tons of material being processed each day. In the example of FIG. 6A, the data collected after installation was collected automatically by the operation data monitoring and collection system 12 and the data from the old machine was collected when interviewing the customer. The target values can include: a consultant's estimate of the machine's production capacity on the customer's manufacturing application; a fixed value derived from a time study algorithm; or a manufacturing time of similar parts manufactured by the same installed machine. The time study data is derived from a simulation provided by manufacturing software. For example, the simulation can verify the process stages employed in a manufacturing process. Consequently, the user can calculate the manufacturing time (time study) in the simulation based upon the duration of each stage.

Figure 6B:
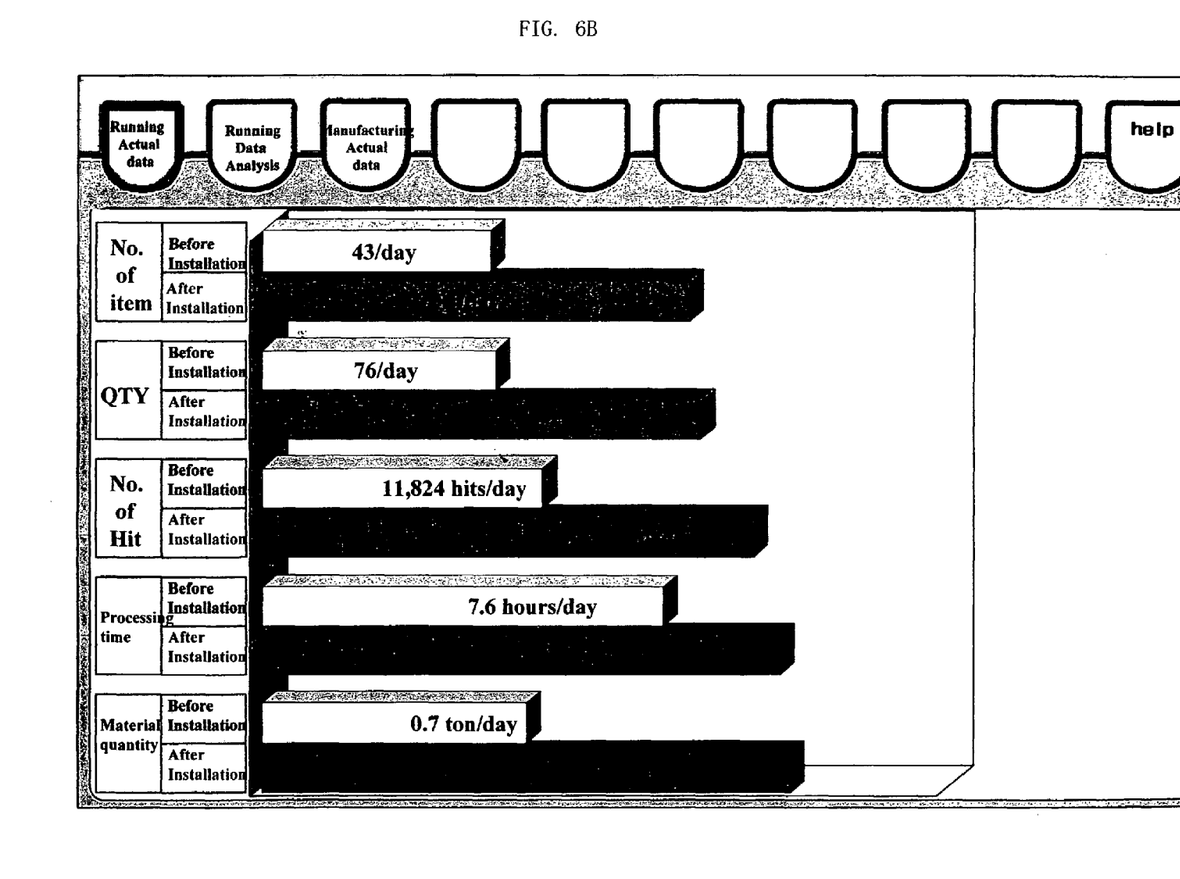
Figure 6C:
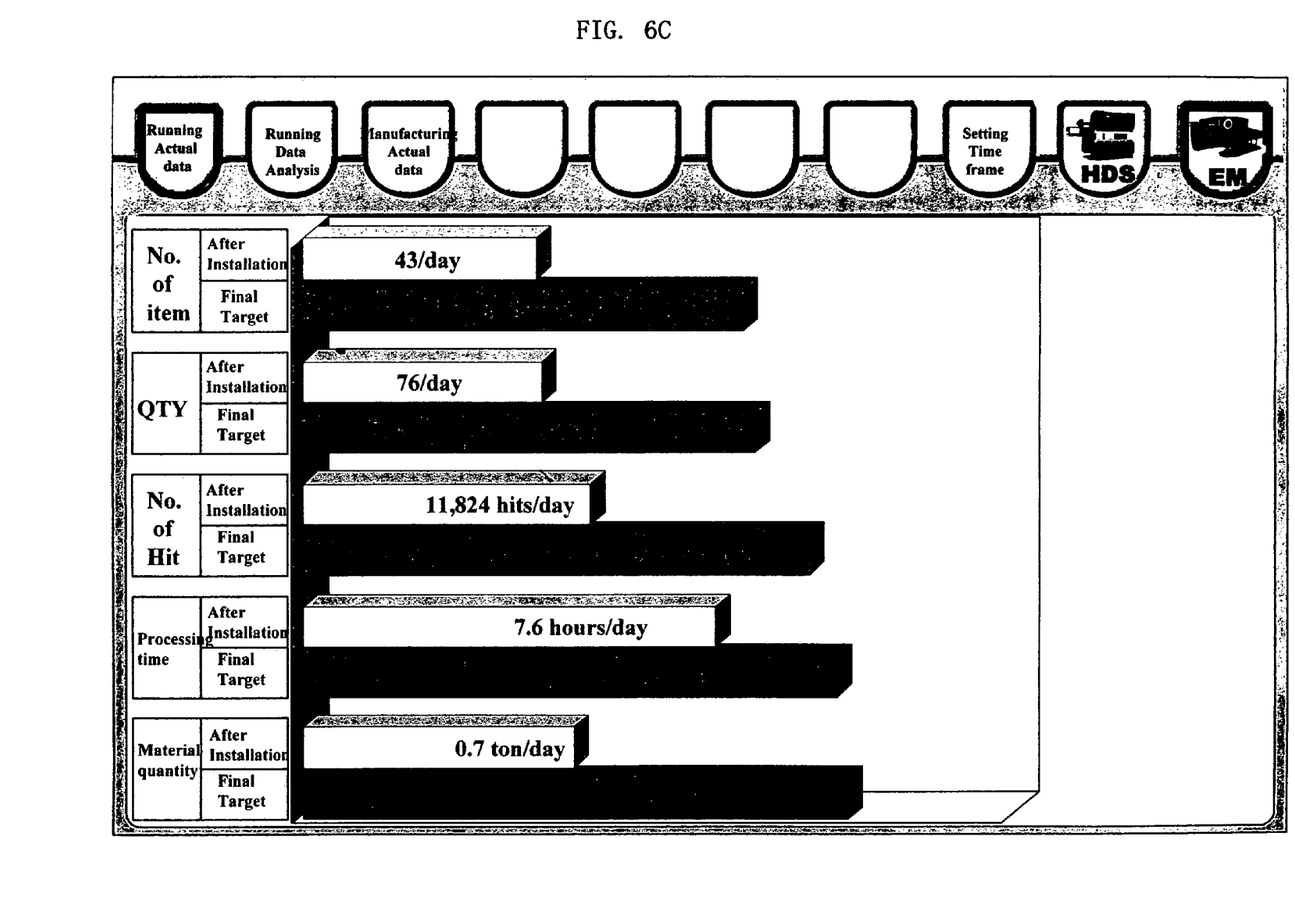

Referring back to FIG. 6A, because each of the post installation results falls short of the target values, additional support is provided to the customer to reduce or eliminate the shortcomings Although FIG. 6A shows before installation, after installation and final target values, a display 6B showing before installation and after installation values, or a display 6C showing after installation and the final target values can also be provided.

A product analysis based upon the collected data can be used to evaluate the time required to make a product, for example, the customer's main product. The product analysis compares and verifies the effectiveness of the product manufacturing time, before improvement, after improvement and against a target value. As with the machine analysis, the product analysis can compare two different machines to verify the effectiveness of the manufacturing time before and after installing a new machine, while considering the target value. The product analysis can also compare the performance of the same machine, before and after improvement, to verify the effectiveness of the upgrade by comparison to a target value.

Figure 7A:
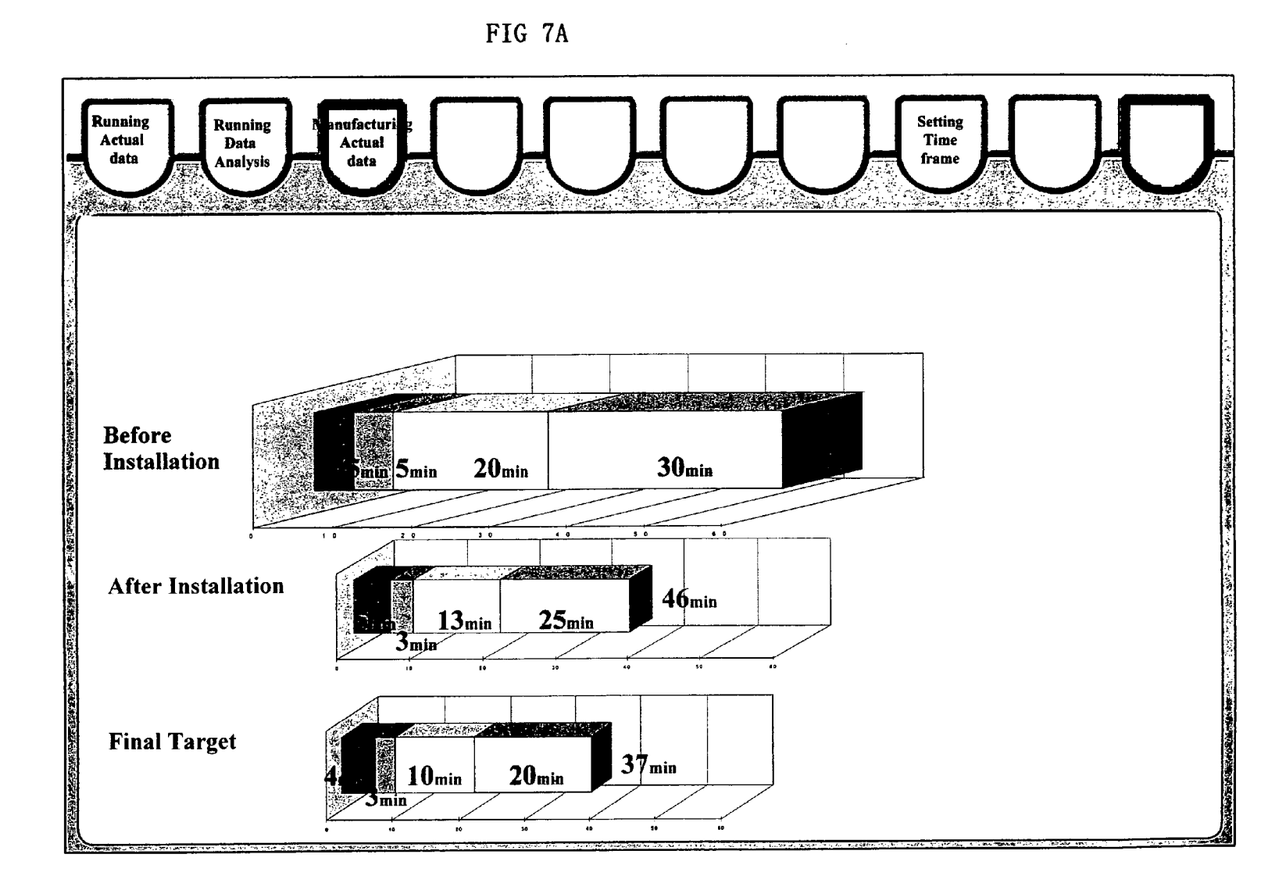
FIGS. 7A, 7B, and 7C show examples of a product analysis, in accordance with an aspect of the present invention.
Figure 7B:
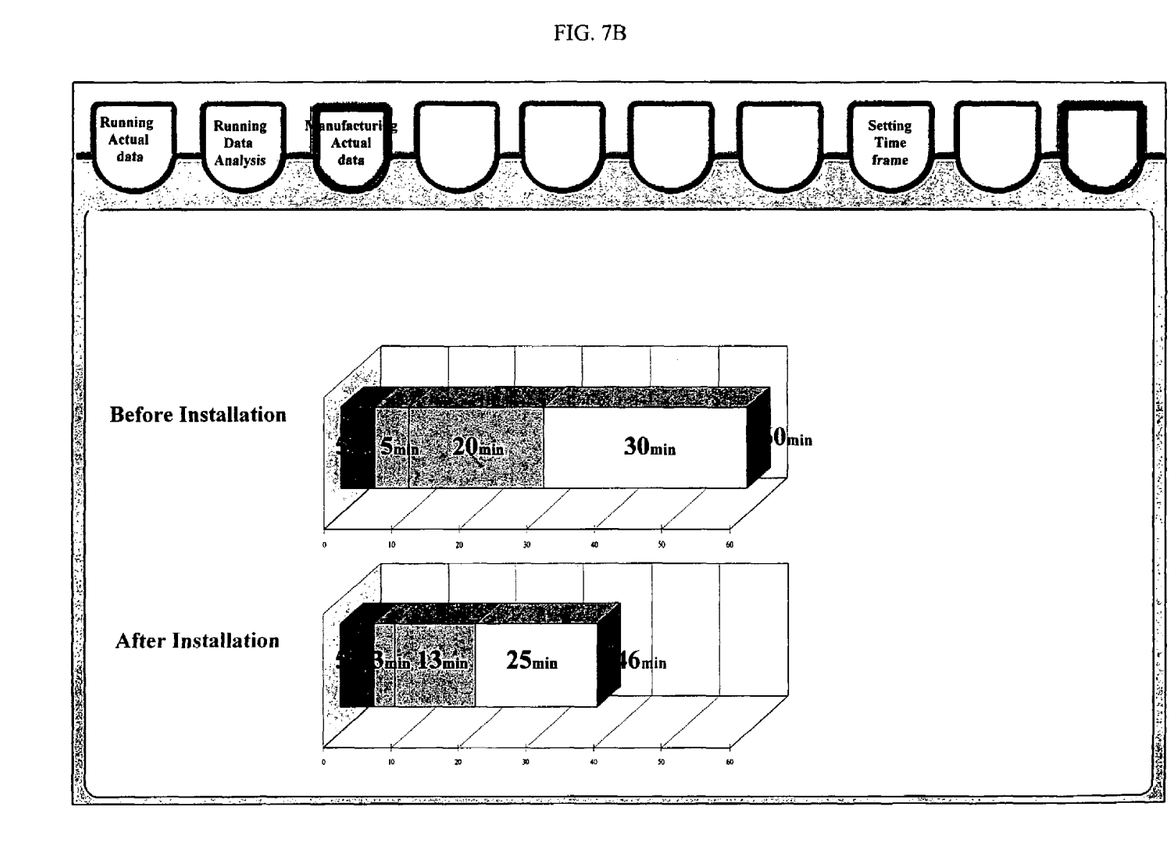
Figure 7C:
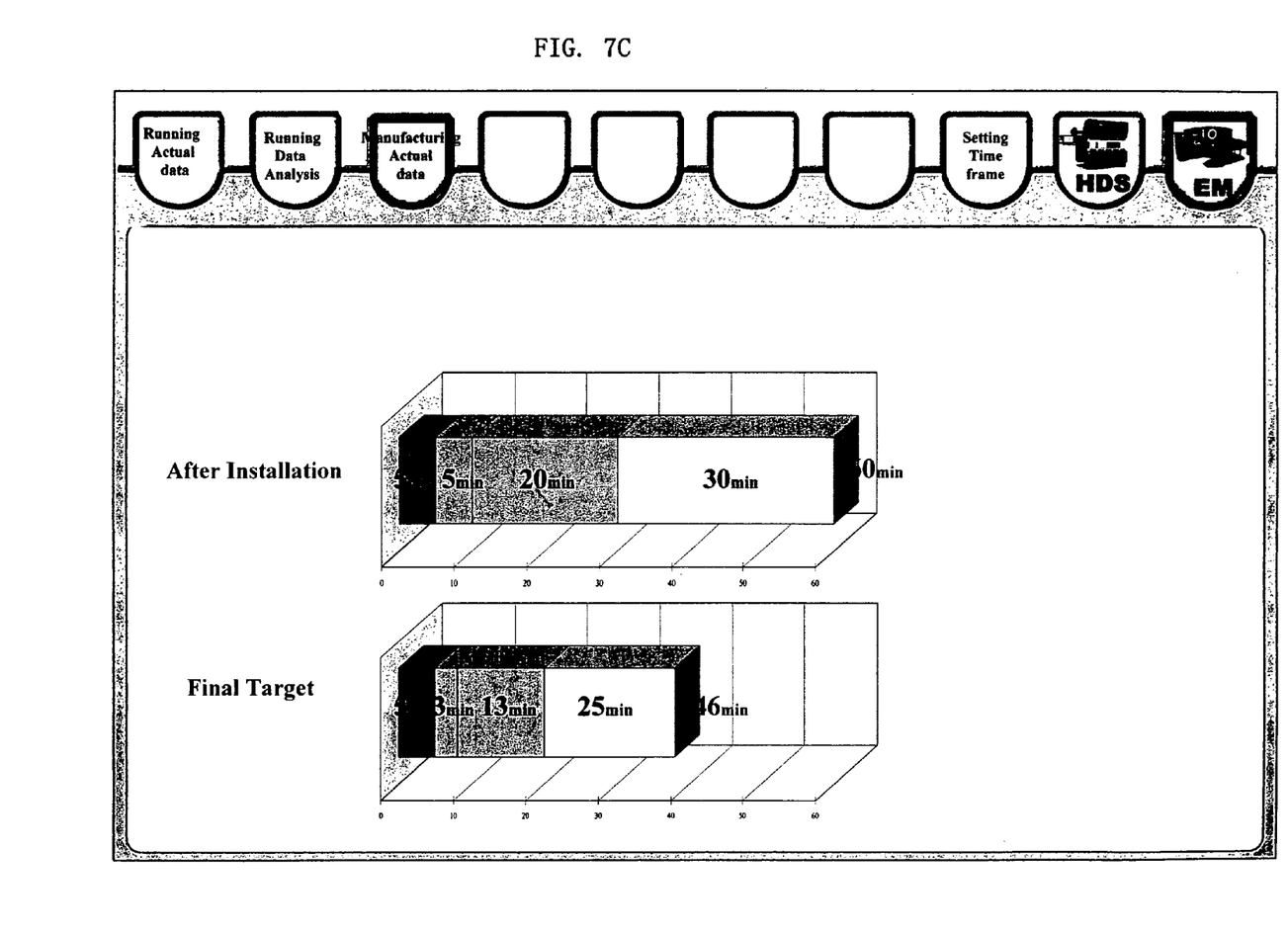

FIG. 7A shows the results of a product analysis. In FIG. 7A, sixty minutes were required to manufacture a product with the old machine, whereas only 46 minutes were required to manufacture the same product with the new machine. The target time is 37 minutes. Thus, support is provided to the customer to reduce/eliminate the extra time required to manufacture the product. A more detailed break down of the time is also shown in FIG. 7A. Although FIG. 7A shows before installation, after installation and final target values, a display 7B showing before installation and after installation values, or a display 7C showing after installation and the final target values can also be provided.

A time analysis can be performed to see whether the newly installed machine's processing time is as it should be, based upon the machine manufacturer's knowledge of average processing time for the machine. The time analysis usually takes place with respect to a specific product. The machine operating performance (for example, the average number of operating hours or number of hitting times) can be compared with the expected standard performance. In addition, the manufacturing time of a product can be compared with the standard product manufacturing time (based upon data compiled by the machine manufacturer).

A historical data analysis can be used to project and suggest the next maintenance time, such as a supply replacement, based upon the historical maintenance information. That is, if it is known that a tool requires a check up every twelve hours of use and replacement every thirty hours of use, by maintaining a history of the tool's use, the system can inform the customer when the next check up and maintenance times are. For example, if the monitoring indicates that the tool has been used for ten hours, the customer can be informed that after two more hours of use a check up should occur.

Finally, a trend analysis can be performed to verify whether a predicted improvement resulting from the machine upgrade/replacement was accurate. The machine operating performance trends can be observed by storing long term information continuously. The trend analysis can also help discover if a problem exists, for example if the average output drops. For example, a decreasing tend could indicate that maintenance is required.

The last step of the customer support process is presenting a proposal and/or providing a solution, as shown in step S14.

Based upon an analysis of the customer's current operating conditions a proposal may be presented to the customer for increasing profit. That is, the proposal shows how installing a new machine will increase the customer's profit, while accounting for the cost of installation.

In order to prepare the proposal, a customer is selected and the factory is diagnosed. Next, a customer file is created based upon the customer's manufacturing machines, production items, and production quantity to identify increased profit opportunities. The current machine performance is then examined. As described above, the time of the production at the each step using the customer's major product is measured. Finally, the potential increase in profit is discussed with the customer. If the customer is interested in the proposal, a conditional contract is signed to make the customer a partner. The conditional contract permits the customer to return the new machine if the proposed profit increase does not occur or is unacceptable.

After the conditional contract is signed, the installation process occurs. In one embodiment, the installation process includes a pre-installation meeting, and pre-installation training before the machine is delivered. After the machine is installed, a trial run is performed and post-installation training occurs.

After the machine has been installed, the new machine will be supported, as described above, to ensure the proposed profit is achieved, i.e., customer satisfaction is achieved. The support verifies whether the new machine is operating 100% of the time and whether the increased profit target established in the proposal is achieved. Once it is verified that the proposed increased profits has been achieved, a formal final contract may be signed. Otherwise, based upon the conditional contract, the customer can return the new machine. If the sale is a success, the success story can be reported.

The last step of the process may also include providing a solution, such as maintenance. For example, replacement or maintenance of parts may be suggested and/or a maintenance report can be generated.

Because the machine operating information is periodically analyzed, the performance of the machine can be checked. The results can be reported to the customers and if there are problems, solutions can be suggested. For example, defective parts can be discovered if numerous stop time/alarms are detected. Therefore, replacement or maintenance of a part may be needed.

Maintenance services may also be provided. For example when a part is damaged, the damaged condition can be graphically recorded. If the MHD team is not able to solve the problem, the graphics images can be sent to the service center 18, which can respond with advice.

In one embodiment, graphics images are recorded after the repair, and a service work report is created. After the service work is done, it should be reported to the customer.

The present invention can also facilitate order of supplies and parts. Preferably, service or parts are ordered and the date of the service is recorded. The parts can be ordered by the cell phone if the part codes are clear. If not, the parts can be ordered with help from a software application that locates part numbers based upon machine diagrams.

Thus, the present invention monitors machines running at customer sites and provides the customer with adequate support. The present invention tracks the machine status at the customer site and effectively uses the information at a central location to provide product proposals. In one embodiment, the machine status before and after upgrade/installation is researched. The present invention also continuously monitors the machines to check the effectiveness of the installed machines.

Steps for new machine installation can include frequently recording the machine operating conditions, analyzing collected data, suggesting new products to solve problems found through analysis, and ordering new products immediately. After the new products are delivered, installation effectiveness will be continuously monitored.

Maintenance (including preventative maintenance) can include frequently recording the machine operating conditions, analyzing collected data, suggesting machine maintenance or parts to solve any problem found (or predicted) through analysis, immediately ordering and delivering parts that solve the problem, verifying and reporting the problem and solution to the customer, and continuously monitoring the machine to verify that the problem was solved.

In one embodiment, data continuously collected and analyzed includes a machine operation log, graphics images of the operating machine, questions and answers related to the customer, the maintenance history, and the history of purchased parts.

Thus, central management of a customer's machines is enabled. Accordingly, proposals can me made to the customer, and the machine's effectiveness can be checked. Consequently, complete customer support is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs operating on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

What is claimed is:

1. A method for centrally monitoring a plurality of sheet metal manufacturing machines installed at remote customer sites and providing customers with support, the method comprising:

collecting machine operating data on the processing of a workpiece for each stage in the processing of a workpiece at a customer site of a customer, the machine operating data being individually collected for each of the individual stages in the processing of a workpiece;

analyzing, at a central location, the collected machine operating data for one of the plurality of machines;

proposing to the customer a solution based upon the analysis;

implementing the solution using a computer;

continuously collecting data to check effectiveness of the installed machines in processing workpieces and to verify that the implemented solution works;

comparing the data associated with individual process stages of newly upgraded or installed machines to a target value; and providing an input to reduce the difference between the target value and the data associated with individual process stages of newly upgraded or installed machines to a target value, wherein the target value is derived from a time study algorithm and time study data, wherein the target value is derived from at least one of the following: a consultant estimate of production capacities of the newly upgraded or installed machines, a fixed value derived from the time study algorithm, and a manufacturing time associated with similar workpieces manufactured by the newly upgraded or installed machines, wherein the time study data is derived from a simulation which verifies process stages employed in a manufacturing process, wherein the time study data derived from the simulation is based upon the duration of the individual process stages, and wherein the machine operating data comprises data on the operation of the installed machines and the effectiveness of the installed machines in processing workpieces.

2. The method of claim 1, further comprising researching a machine status before a machine installation.

3. The method of claim 1, in which the proposing further comprises proposing a profit increase based upon current data.

4. The method of claim 1, in which the analyzing further comprises comparing a manufacturing time for a product after an upgrade with a target manufacturing time for the product.

5. The method of claim 1, in which the analyzing further comprises comparing a newly installed machine's performance with a target machine's performance.

6. The method of claim 1, in which the analyzing further comprises comparing a processing time for a product on a newly installed machine with a known average processing time for the product.

7. The method of claim 1, in which the analyzing further comprises analyzing a long term trend.

8. The method of claim 1, in which the machine operating data comprises a machine operation log, graphics images of the machine, a maintenance history, customer questions and answers, and a history of purchased parts, wherein the graphics are taken by a camera to continuously monitor the machine to verify that a problem was resolved and to periodically record an operating condition of the machine.

* * * * *